United States Patent
Engler et al.

Patent Number: 5,989,501
Date of Patent: Nov. 23, 1999

[54] PLANT FOR THE PRODUCTION OF HYDROGEN AND OF ENERGY

[75] Inventors: Yves Engler, Vincennes, France; Francois Fuentes, Houston, Tex.

[73] Assignee: L'Air Liquide, Societe Anonyme pour l'Etude et l'Exploitation des Procedes Georges Claude, Paris, France

[21] Appl. No.: 09/210,730

[22] Filed: Dec. 15, 1998

Related U.S. Application Data

[62] Division of application No. 08/742,593, Oct. 28, 1996, Pat. No. 5,888,470.

[30] Foreign Application Priority Data

Oct. 26, 1995 [FR] France .................................. 95 12631

[51] Int. Cl.$^6$ .................................................. B01D 53/34
[52] U.S. Cl. .................................................. 422/171
[58] Field of Search .................................. 422/171, 177; 252/373; 423/648.1

[56] References Cited

U.S. PATENT DOCUMENTS

| | | | |
|---|---|---|---|
| 4,309,359 | 1/1982 | Pinto | ........................ 252/373 |
| 4,690,695 | 9/1987 | Doshi . | |
| 4,701,187 | 10/1987 | Choe et al. . | |
| 4,725,380 | 2/1988 | Pinto . | |
| 4,725,381 | 2/1988 | Pinto . | |
| 5,152,975 | 10/1992 | Fong et al. . | |
| 5,354,547 | 10/1994 | Rao et al. . | |
| 5,741,474 | 4/1998 | Isomura et al. . | |

FOREIGN PATENT DOCUMENTS

| | | |
|---|---|---|
| 0 092 969 | 11/1983 | European Pat. Off. . |
| 0 217 505 | 4/1987 | European Pat. Off. . |
| 0 574 285 | 12/1993 | European Pat. Off. . |

*Primary Examiner*—Wayne Langel
*Attorney, Agent, or Firm*—Young & Thompson

[57] ABSTRACT

A process for the generation of energy and of a hydrogen-rich mixture (30), includes the following steps:

a) a partial oxidation of an incoming hydrocarbon gas mixture (15) is carried out using an oxidant mixture (16) which contains oxygen, so as to obtain as output from the unit a reaction gas (17) which contains hydrogen and CO;

b) the reaction gas produced at the end of step a) is passed into a membrane separator (24) which generates, as its permeate output, a permeate gas mixture (25) enriched in the more permeable components of the reaction gas and, as its retentate output, a retentate gas mixture (26) enriched in the less permeable components of the reaction gas;

c) the retentate gas mixture (26) is treated in an electricity generation unit (27);

d) the permeate gas mixture (25) is separated in a preferential adsorption separator (29) so as to obtain, as unadsorbed product gas, the desired hydrogen-rich gas mixture (30).

4 Claims, 3 Drawing Sheets

PLANT FOR THE PRODUCTION OF HYDROGEN AND OF ENERGY

CROSS-REFERENCE TO RELATED APPLICATIONS

This application is a division of copending application Ser. No. 08/742,593, filed Oct. 28, 1996, now U.S. Pat. No. 5,888,470.

BACKGROUND OF THE INVENTION

The present invention relates to the field of hydrogen generation by partial oxidation of hydrocarbon mixtures (a technology usually referred to as "POX" in the literature, standing for Partial Oxidation). The invention relates more particularly to the processes and plants for the simultaneous generation of hydrogen and energy.

Many processes have been reported in the literature, relating to the production of hydrogen and/or energy, on the basis of partial oxidation of hydrocarbon mixtures (such as coal, natural gas, naphtha and heavy fuel oil), and giving rise, depending on the reaction conditions (temperature, pressure and composition of the reactive gases), to a highly variable composition of the reaction gas produced. Reference will be made to the many articles published in the name of TEXACO, SHELL or WESTINGHOUSE.

The reaction gas produced as output from a partial oxidation unit usually contains several tens per cent of the $H_2/CO$ mixture, but also nitrogen, $CO_2$, argon, etc.

The available processes usually include, downstream of the partial oxidation unit, one or more reaction gas purification steps: removal of CO generally by catalytic reaction with steam, of all or part of its $H_2S$, of COS (carbonyl sulphide) and of NOx (purification steps well known to those skilled in the partial oxidation art).

Downstream of these purification steps, the reaction gas thus purified is usually sent to a preferential adsorption separator (for example of the PSA type) or else to a membrane-type separator, so as to produce, according to the required specification in each case, energy or a hydrogen stream or a stream of CO.

Among the oxidants most often cited in the literature regarding POX are air or air enriched in oxygen up to 35% or even more.

From this copious literature, mention may be made of the document EP-A-217,505 which describes the simultaneous generation of energy and of a mixture having at least 50% hydrogen, the mixture containing the hydrogen being produced as the "unadsorbed product" stream from a preferential adsorption separator, in which the reaction gas produced as output from a POX unit has been treated, the energy being moreover produced by sending the gas mixture adsorbed in the separator (rich in CO, $CO_2$, $N_2$, $CH_4$, etc) into a unit for the generation of electricity by catalytic combustion followed by expansion in a gas turbine.

Since the objective of this document is to provide a mixture containing hydrogen used for the synthesis of ammonia, relatively low concentrations of argon are tolerated. The author however mentions that the gas generated by the adsorption separator contains non-negligible quantities of argon (which derives from the oxidant gas supply used) , argon that the document declares is tolerated without any inconvenience.

Work successfully carried out by the Applicant in this field has confirmed that, in the case of such argon-containing oxygen supplies, this argon is largely found in the hydrogen-rich mixture produced by the process. However, although in many subsequent applications using such a hydrogen-rich mixture the argon presents no inconvenience, in other cases (such as hydrodesulphurization or hydrocracking processes), the argon lowers the partial pressure of the hydrogen in the gas mixtures used, giving rise to markedly inferior reactions.

Faced with this problem, it may be firstly envisaged to use very pure (typically 99.5%) oxygen, thus further increasing the operating costs of the unit.

Another technically achievable solution might consist in sizing a PSA preferential adsorption unit so as to stop the argon much better, but such sizing would then be not without consequences with regard to the cost of the plant and to its performance (reduction in the hydrogen extraction yield and increase in the quantity of low-value low-pressure adsorbed retentate gas).

SUMMARY OF THE INVENTION

One object of the present invention is to propose a process and a plant for the generation of energy and of a hydrogen-rich mixture allowing:

the simultaneous generation of energy and of a mixture having a very high hydrogen purity (reaching, depending on the expressed wishes, where necessary 99.9% or even 99.99% of hydrogen);

the possibility of using, in the partial oxidation preparation, impure oxygen (which may, depending on the original situation, be highly variable and therefore they contain, as the case may be, a significant quantity of argon);

access to excellent flexibility in the ratio of the hydrogen concentration in the mixture generated to the quantity of electricity generated: the objective here being to be able to modify this ratio as required, but also, where necessary, to keep it constant despite appreciable modifications in the characteristics (for example the H/C ratio) of the incoming hydrocarbon gas mixture which is to be treated in the partial oxidation unit.

The process for the production of energy and of a hydrogen-rich mixture according to the invention therefore consists of the implementation of the following steps:

a) a partial oxidation of an incoming gas mixture, containing a hydrocarbon or a mixture of hydrocarbons, is carried out in a partial oxidation unit using an oxidant mixture which contains oxygen, so as to obtain, as output from the unit, a reaction gas which contains hydrogen and carbon monoxide CO;

b) the reaction gas produced at the end of step a) is passed into a membrane separator in order to generate, as its permeate output, a permeate gas mixture enriched in the more permeable components of the reaction gas and, as its retentate output, a retentate gas mixture enriched in the less permeable components of the reaction gas;

c) the said retentate gas mixture is treated in an electricity generation unit;

d) the said permeate gas mixture is separated in a preferential adsorption separator so as to obtain, as unadsorbed product gas, the required hydrogen-rich gas mixture.

By "membrane separator" is understood according to the invention, where appropriate, a semi-permeable membrane or membrane module, or a set of semi-permeable membranes or membrane modules mounted in series and/or parallel, having properties of separating the hydrogen from the reaction gas coming into the separator.

The process according to the invention therefore includes the use, in combination and in series, of a membrane separator and of a preferential adsorption separator. The preferential use of a membrane separator having a high $H_2/N_2$, $H_2/CO$ and $H_2/Ar$ selectivity makes it possible to feed the preferential adsorption separator with a hydrogen-rich gas, at an optimum pressure, while the retentate gas mixture from the membrane separator (which essentially contains CO, argon and nitrogen) may be sent to the electricity generation unit.

As explained later with regard to examples of implementation, the process according to the invention makes it possible, by the suitable choice of the characteristics of the membrane separator, to generate, on the one hand, very pure hydrogen (for example ranging from 99.5 to 99.9% pure), while at the same time, at the very beginning of the chain, using impure oxygen, therefore including oxygen containing a significant concentration of argon.

Moreover, the quantity of adsorbed retentate gas generated by the preferential adsorption separator, at very low pressure (and therefore of low value) is minimized since it is inversely proportional both to the hydrogen content present on entering the separator and to its extraction yield.

The principle of membrane-type gas separation will be briefly recalled here, this being that, due to the effect of a difference in partial pressure on either side of the membrane, a low-pressure mixture, enriched in the more permeable components of the gas entering the membrane separator, is produced on the permeate side of the membrane separator, and a mixture at a pressure close to the feed pressure of the incoming mixture and enriched in the less permeable components is produced on the retentate side of the separator.

For example, with regard to hydrogen or CO generation, a recovery operation is usually carried out starting with mixtures deriving from certain industries, which are separated on membranes having properties of separating hydrogen from the other components in the mixture (membranes of the polyaramid type, for example, are used), the hydrogen-enriched mixture being produced on the permeate side while the mixture enriched, depending on the situation, in hydrocarbons or in CO is produced on the retentate side of the membrane.

It appears that the performance of such a membrane separation will very largely depend on the conditions of use of the membrane, such as the temperature, feed pressure of the membrane, or the content in the incoming mixture to be separated, of the component which it is desired to extract on the permeate side.

It is thus known, with regard to temperature, that by increasing the operating temperature of the membrane the permeability and therefore the productivity of the membrane usually increase, but to the detriment of its selectivity and therefore of the yield. By the term "operating temperature" of the membrane or of the membrane module is usually understood the temperature produced within the membrane or the module because of the temperature of the incoming gas which travels through it, sometimes with the additional intervention of an external system for heating the membrane module or for temperature maintenance (thermostatted chamber).

A few definitions will be recalled here with regard to the conventional case of the generation of nitrogen from air: the "yield" of the membrane represents the proportion of nitrogen present in the incoming mixture which is found on the retentate output side of the membrane, the $O_2/N_2$ selectivity of the membrane representing the ratio of oxygen permeance or permeability to the nitrogen permeance or permeability through the membrane (selectivity=oxygen permeability/nitrogen permeability). The same type of reasoning is applied in the case of hydrogen separation, the reasoning having to be reversed in terms of extraction yield since here it is the hydrogen-enriched permeate mixture which it is desired to recover.

Throughout the following, use will be made of the simplified term "selectivity of a membrane separator" with regard to a given gas, which should be understood as meaning the selectivity of this separator with regard to the gas in question with respect to the mixture treated in this separator (the selectivity, as mentioned earlier, being a relative concept).

It is therefore possible to change the selectivity of a separator with regard to a given gas (for example hydrogen), for example by employing membrane modules having different properties, or by using modules of the same type but under different operating conditions, especially temperature conditions.

According to one of the embodiments of the invention, the oxygen concentration in the oxidant gas mixture varies within the range going from 21% to 98%.

According to one of the embodiments of the invention, between the partial oxidation step and the membrane separation step, at least one of the following purification operations is carried out:

a treatment of the reaction gas in a carbonyl sulphide (COS) conversion unit;

a treatment of the reaction gas in a desulphurization unit;

a treatment of the reaction gas in a carbon monoxide CO conversion unit, within which at least some of the CO in the reaction gas is converted into carbon dioxide $CO_2$ and hydrogen $H_2$ by catalytic reaction with steam.

The adsorbed retentate gas generated by the separator by preferential adsorption will advantageously be sent into a steam generation unit.

According to another embodiment, the desulphurization step will be located not upstream of the membrane separator but between the membrane separator and the electricity generation unit in the line connecting the retentate output from the separator to this unit. The investment and operating costs of a desulphurization unit are in fact relatively high. The double separation configuration, i.e. membrane separator/preferential adsorption separator, according to the invention, therefore makes it possible, where appropriate, to be able to shift this operation along the retentate line of the membrane separator, thus profiting from the generally observed good $H_2S$ resistance of polymer fibres. This variant makes it possible to decrease the investment appreciably, as well as the consumption of electricity and of steam which are necessary for this desulphurization operation insofar as the volume treated by the desulphurization unit on the retentate side of the membrane separator is necessarily less.

Moreover, the fraction of $H_2S$ which has permeated, on the permeate side of the membrane separator, is stopped on the preferential adsorption separator (without appreciable degradation in the performance of this unit) and ends up in the adsorbed low-pressure retentate from this preferential adsorption separator, which is compressed and returned, for example, to the sulphurous combustible gas system of the refinery (or another incoming hydrocarbon gas supply), or else to a steam generation unit.

Moreover, it is observed that, contrary to the plants for simultaneous generation of hydrogen and electricity according to the prior art, in which the reaction gas deriving from the POX unit is in fact separated into two streams sent to two dedicated lines offering little synergy, the configuration of the process according to the invention makes it possible to modify, or even to regulate, the ratio between the hydrogen concentration in the hydrogen-rich gas mixture generated and the quantity of electricity generated by the electricity generation unit, by varying, for example, one of the following parameters:

the degree of conversion of the unit for conversion of the CO in the reaction gas (when, of course, such a conversion unit is present between the POX unit and the membrane separator);

the hydrogen selectivity of the membrane separator.

As mentioned previously, it will be possible to modify the hydrogen selectivity of the separator by varying, for example, the number and properties of the membrane modules in service in the membrane separator, or alternatively by varying the operating temperature of the separator.

By "operating temperature" is understood, according to the invention, the concept recalled earlier in the present application Such a possibility of modifying or regulating this $H_2$/energy ratio turns out to be absolutely fundamental in order to be able to match the requirements expressed by the user site, but also in order to be able to handle and accommodate significant modifications in the quality (for example the H/C ratio) of the incoming gas mixture to be treated in the partial oxidation unit because of, for example, local production variations occurring on the industrial site supplying the incoming mixture to be treated in the POX unit.

The invention also relates to a plant for the generation of energy and of a hydrogen-rich mixture, especially suitable for implementing the process described above, and comprising:

a supply of an incoming gas mixture containing a hydrocarbon or a mixture of hydrocarbons;

a supply of an oxidant gas mixture which contains oxygen;

a partial oxidation unit, connected to the supplies, in order to be able to generate as its output a reaction gas containing hydrogen and carbon monoxide CO;

a membrane separator, one input of which is connected via a main gas line to the output of the partial oxidation unit;

an electricity generation unit connected via a secondary line to the retentate output of the membrane separator;

a preferential adsorption gas separator, for example of the PSA type, one input of which is connected via a tertiary line to the permeate output of the membrane separator.

Where appropriate, the plant comprises, between the partial oxidation unit and the membrane separator, at least one of the following gas purification units well known to those skilled in the art in this field:

a unit for the catalytic conversion, using steam, of carbon monoxide CO into carbon dioxide $CO_2$ and hydrogen $H_2$;

a unit for the conversion of carbonyl sulphide COS;

a unit for the desulphurization of a gas.

According to one of the embodiments of the invention, the plant comprises, in a secondary line, a unit for the desulphurization of a gas between the membrane separator and the electricity generation unit.

BRIEF DESCRIPTION OF THE DRAWINGS

Further characteristics and advantages of the present invention will emerge from the following description of embodiments given by way of illustration, but implying no limitation, this description relating to the appended drawings in which.

DETAILED DESCRIPTION OF THE INVENTION

Figure 1:
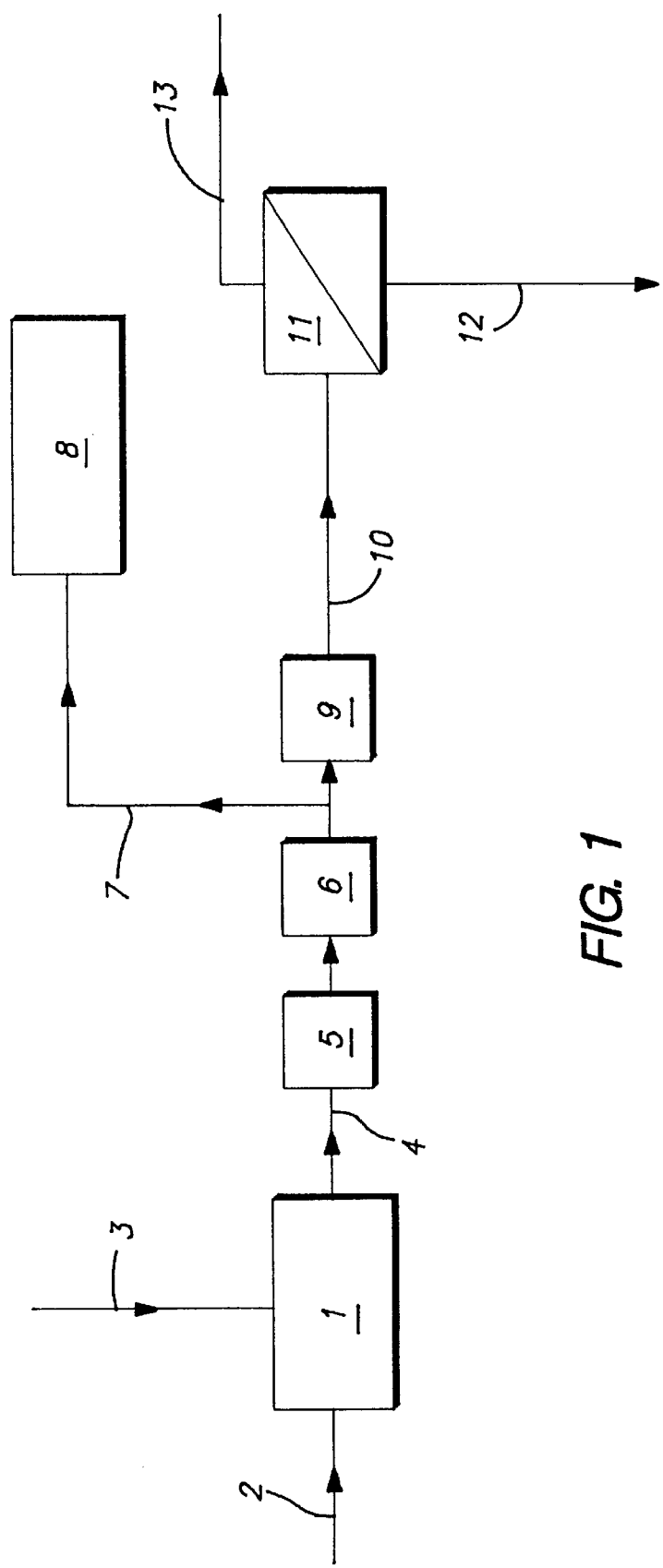
FIG. 1 is a diagrammatic representation of a plant in the prior art for the simultaneous generation of hydrogen and energy.

FIG. 1 therefore illustrates, in a diagrammatic way, an installation according to the prior art for the simultaneous generation of hydrogen and energy, in which the reaction gas coming from the partial oxidation POX unit is split into two streams sent to two dedicated lines.

FIG. 1 shows the presence of a partial oxidation POX unit 1 which is fed, on the one hand, with an incoming hydrocarbon gas mixture 2 and with an oxidant mixture 3 containing oxygen.

The reaction gas 4, resulting from the partial oxidation operation, before it reaches a preferential adsorption separator 11 (which is in this case of the PSA type), undergoes successive operations of COS conversion (unit 5) delsulphurization (unit 6) and partial CO conversion (unit 9).

The CO conversion unit 9 is necessary here in order to increase the hydrogen content in the mixture reaching the input to the PSA separator and to decrease its CO content. This is because, without the presence of such a CO conversion unit, the yield of the PSA separator would be appreciably lower and therefore the quantity of gas necessary on the input side of the PSA separator, in order to generate the same quantity of hydrogen, would be appreciably greater.

Some of the reaction gas produced as output from the unit 6 is sent, via a dedicated branch line 7, to an energy generation unit 8.

The purified reaction gas 10 produced as output from the unit 9 reaches the PSA separator 11, giving rise to the generation of an unadsorbed product gas 13, rich in hydrogen, and of an adsorbed retentate gas 12 (after desorption) which may possibly be utilized in a steam generation unit or recycled back to the input of the partial oxidation unit 1.

Figure 2:
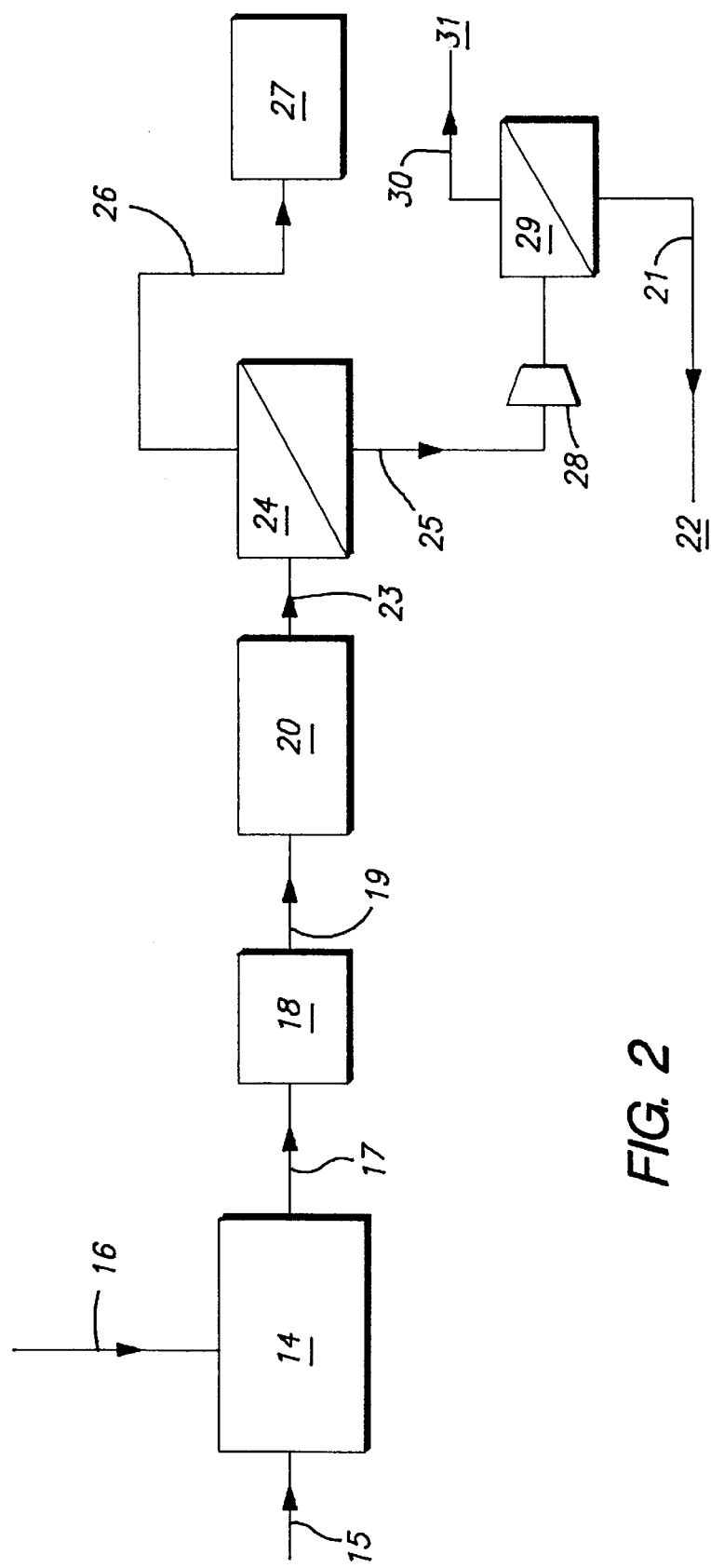
FIG. 2 is a diagrammatic representation of a plant suitable for implementing the process according to the invention.

As regards FIG. 2, this illustrates an installation suitable for implementing the process according to the invention, employing, in series, a double operation of membrane separation followed by separation by preferential adsorption of the PSA type.

The reference numbers 15 and 16 respectively symbolise the incoming (hydrocarbon-rich) and oxidant (oxygen-containing) gas mixtures which are to react in the partial oxidation unit 14 in order to generate a reaction gas 17 containing hydrogen and CO.

As indicated previously, the incoming (hydrocarbon-rich) gas mixture may have a highly varied composition, for example methane, coal, etc.

In the embodiment shown, the reaction gas coming from the unit 14, before it enters a membrane separator 24, undergoes two purification operations: COS conversion in the unit 18 and desulphurization in the unit 20.

The reaction gas 23, thus purified, enters a membrane separator 24 in which is generated, as retentate output from the membrane separator, a retentate gas mixture 26, rich in particular in CO, $CO_2$ and $N_2$, which is sent to an electricity generation unit 27.

Produced on the permeate side of the separator 24 is a hydrogen-rich permeate gas mixture 25, produced at low pressure, which is recompressed, by means of a compressor 28, before it reaches a PSA-type preferential adsorption separator 29 in order to generate, at high pressure, a hydrogen-rich unadsorbed product gas 30 and, at low pressure, an adsorbed retentate gas 21 which is rich, in particular, in $CO_2$ and CO.

The gas mixture 30 is then ready to be sent to a possible user station 31 which uses such a hydrogen-rich gas mixture. As for the low-pressure mixture 21, this may, for example, be sent to a steam generation unit 22 or be returned to the source of incoming hydrocarbon-rich gas, which may be a refinery, for example.

This operating diagram of a plant for implementing the process according to the invention illustrates the fact that it is possible, by means of this process, and according to the specifications required by each user site, to dispense with the CO conversion step.

Figure 3:
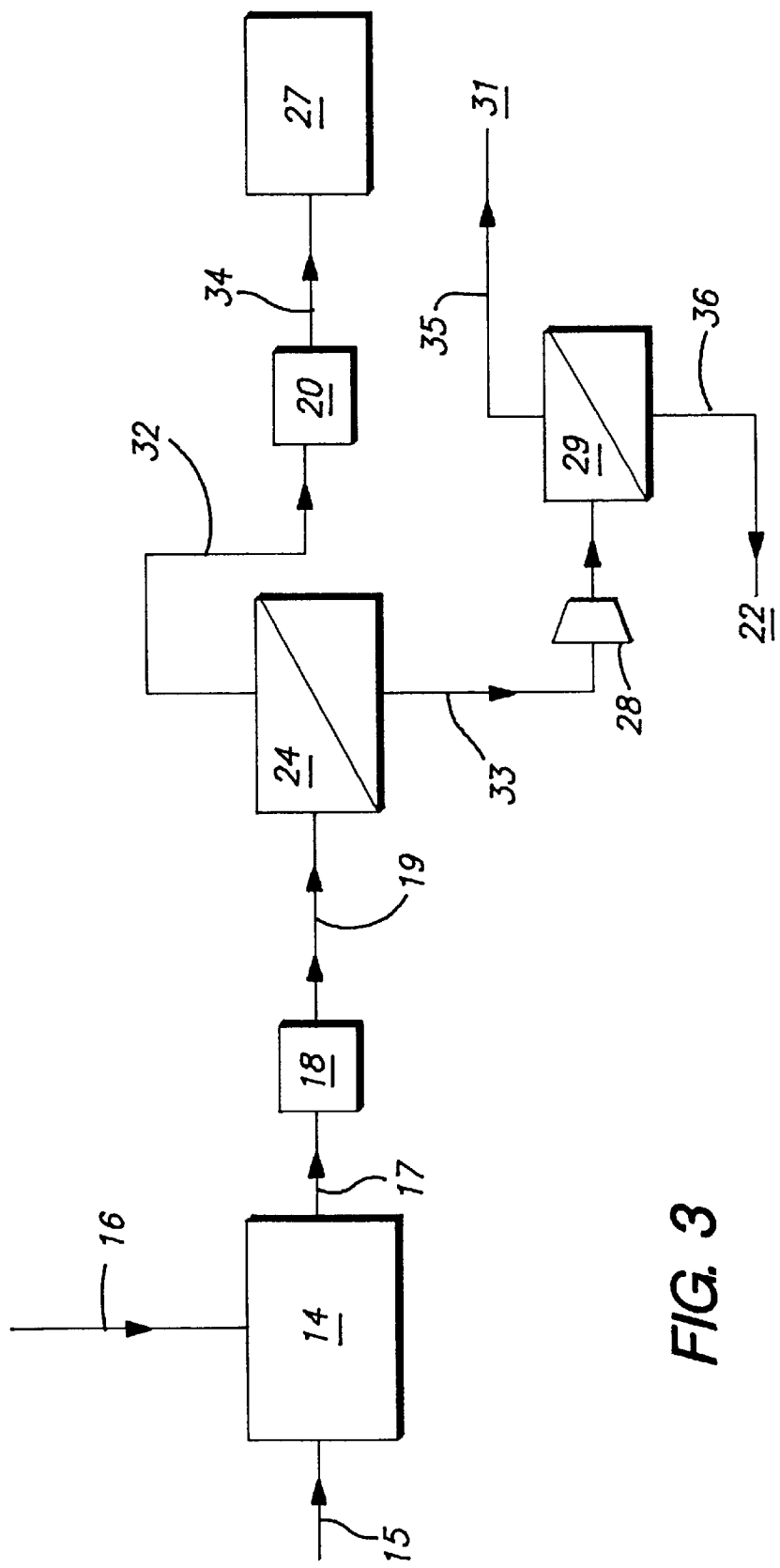
FIG. 3 is a diagrammatic representation of another plant suitable for implementing the process according to the invention, involving a desulphurization operation located downstream of the membrane separator.

FIG. 3 provides a variant of the plant described previously in the context of FIG. 2, in which the desulphurization unit 20 is here no longer placed upstream of the membrane separator 24 but downstream of this separator 24, in the secondary line connecting the retentate output of the membrane separator 24 to the electricity generation unit 27.

Since the reaction gas 19 reaching, in this case, the membrane separator 24 has undergone an overall purification operation different from that undergone within the context of FIG. 2, the gas mixture separated in the membrane separator 24 is therefore different from that separated within the scope of FIG. 2, and therefore the various gas mixtures involved downstream of the separator and reaching, respectively, the electricity generation unit 27, the PSA separator 29, the user station 31, or the point of recovery 22 of the low-pressure retentate gas mixture produced by the PSA separator 29 are symbolised by different numbers.

Tables I, II and III illustrate the following examples of implementation:

Table I: a comparative example, illustrating the use of the plant in FIG. 1, with an oxidant mixture containing 99.5% oxygen;

Table II: a comparative example, illustrating the use of the plant in FIG. 1, with an impure oxidant mixture containing 95% oxygen:

Table III: an example of implementation of the invention, within the context of the plant in FIG. 2, with the use of an oxidant mixture containing 95% oxygen.

It may thus be observed that, in the example of Table I (which employs a solution using very pure, 99.5% pure, oxygen), an unadsorbed product mixture is produced as output from the PSA separator which is very pure in terms of hydrogen, with a residual argon concentration of about 0.1%.

Since some of the reaction gas produced as output from the unit 6 is sent, via a dedicated line, to the energy generation unit, this gas has therefore undergone no selective separation operation and it therefore contains approximately equal parts of CO and hydrogen.

As regards the comparative example of Table II, this illustrates a solution using the plant of the prior art with a low-purity oxidant mixture (95% oxygen). There is therefore once again an appreciable amount of argon (about 1%) in the product gas mixture produced as output from the PSA separator, further vitiating the hydrogen partial pressure in this mixture produced for the purpose of using it subsequently in sensitive operations such as hydrodesulphurization or hydrocracking.

The above remark made with regard to the composition of the gas mixture sent to the electricity generation unit may also be made here.

In contrast, looking at the results in the example of Table III according to the invention, it may be seen that the process described makes it possible to produce, starting from an oxidant supply of low oxygen purity (containing 5% of residual argon) as output from the PSA separator, a hydrogen of very high purity (approximately 99.9%) with an allowable residual argon concentration (about 0.1%).

As described previously, the double operation according to the invention, of membrane separation followed by preferential adsorption separation, therefore makes it possible, on the one hand, to produce, starting from an impure oxygen, excellent hydrogen selectivity while at the same time sending to the electricity generation unit a gas mixture as produced as retentate output from the membrane separator, the composition of which is very selectively determined (in this case, very rich in CO)

Although the present invention has been described in relation to particular embodiments, it is not thereby limited to them but, on the contrary, is capable of modifications and of variants which will be apparent to those skilled in the art within the context of the claims below.

TABLE I

| Fluid | Mixture "2" | Mixture "3" | Mixture "4" | Output Unit "5" | Output Unit "6" | Mixture "10" | Mixture "13" | Mixture "12" | Mixture "7" |
|---|---|---|---|---|---|---|---|---|---|
| Composition, dry vol. % | | | | | | | | | |
| $N_2$ | | 0.00 | 0.00 | 0.00 | 0.00 | 0.00 | 0.00 | 0.00 | 0.00 |
| $O_2$ | | 99.50 | 0.00 | 0.00 | 0.00 | 0.00 | 0.00 | 0.00 | 0.00 |
| Ar | | 0.50 | 0.13 | 0.13 | 0.13 | 0.09 | 0.09 | 0.09 | 0.13 |
| CO | | | 48.17 | 48.14 | 49.59 | 3.43 | 0.00 | 7.46 | 49.59 |
| $H_2$ | | | 42.82 | 42.79 | 44.08 | 61.34 | 99.91 | 16.01 | 44.08 |
| $CO_2$ | | | 7.14 | 7.20 | 5.94 | 34.96 | 0.00 | 76.05 | 5.94 |
| $CH_4$ | | | 0.25 | 0.25 | 0.26 | 0.18 | 0.00 | 0.39 | 0.26 |
| $H_2S$ | | | 1.43 | 1.50 | 0.00 | 0.00 | 0.00 | 0.00 | 0.00 |

TABLE I-continued

| Fluid | Mixture "2" | Mixture "3" | Mixture "4" | Output Unit "5" | Output Unit "6" | Mixture "10" | Mixture "13" | Mixture "12" | Mixture "7" |
|---|---|---|---|---|---|---|---|---|---|
| COS | | | 0.07 | 0.00 | 0.00 | 0.00 | 0.00 | 0.00 | 0.00 |
| | | | 100.00 | 100.00 | 100.00 | 100.00 | 100.00 | 100.00 | 100.00 |
| kg/h | 1000 | 1000 | | | | | | | |
| dry flow rate $Nm^3/h$ | | 709 | 2803 | 2805 | 2722 | 1853 | 1001 | 852 | 1441 |
| $N_2$ | | 0 | 0 | 0 | 0 | 0 | 0 | 0 | 0 |
| $O_2$ | | 706 | 0 | 0 | 0 | 0 | 0 | 0 | 0 |
| Ar | | 4. | 4 | 4 | 4 | 1.67 | 1 | 1 | 2 |
| CO | | | 1350 | 1350 | 1350 | 64 | 0 | 64 | 715 |
| $H_2$ | | | 1200 | 1200 | 1200 | 1136 | 1000 | 136 | 635 |
| $CO_2$ | | | 200 | 202 | 162 | 648 | | 648 | 86 |
| $CH_4$ | | | 7 | 7 | 7 | 3 | | 3 | 4 |
| $H_2S$ | | | 40 | 42 | 0 | 0 | | 0 | 0 |
| COS | | | 2 | 0 | 0 | 0 | | 0 | 0 |

TABLE II

| Fluid | Mixture "2" | Mixture "3" | Mixture "4" | Output Unit "5" | Output Unit "6" | Mixture "10" | Mixture "13" | Mixture "12" | Mixture "7" |
|---|---|---|---|---|---|---|---|---|---|
| Composition, dry vol. % | | | | | | | | | |
| $N_2$ | | 0.00 | 0.00 | 0.00 | 0.00 | 0.00 | 0.00 | 0.00 | 0.00 |
| $O_2$ | | 95.00 | 0.00 | 0.00 | 0.00 | 0.00 | 0.00 | 0.00 | 0.00 |
| Ar | | 5.00 | 1.31 | 1.31 | 1.35 | 0.94 | 0.94 | 0.93 | 1.35 |
| CO | | | 47.60 | 47.56 | 48.99 | 3.40 | 0.00 | 7.02 | 48.99 |
| $H_2$ | | | 42.31 | 42.28 | 43.54 | 60.82 | 99.06 | 20.09 | 43.54 |
| $CO_2$ | | | 7.05 | 7.12 | 5.86 | 34.67 | 0.00 | 71.59 | 5.86 |
| $CH_4$ | | | 0.25 | 0.25 | 0.25 | 0.18 | 0.00 | 0.36 | 0.25 |
| $H_2S$ | | | 1.41 | 1.48 | 0.00 | 0.00 | 0.00 | 0.00 | 0.00 |
| COS | | | 0.07 | 0.00 | 0.00 | 0.00 | 0.00 | 0.00 | 0.00 |
| | | | 100.00 | 100.00 | 100.00 | 100.00 | 100.00 | 100.00 | 100.00 |
| kg/h | 1000 | 1050 | | | | | | | |
| dry flow rate $Nm^3/h$ | | 745 | 2836 | 2836 | 2756 | 1958 | 1010 | 948 | 1397 |
| $N_2$ | | 0 | 0 | 0 | 0 | 0 | 0 | 0 | 0 |
| $O_2$ | | 707 | 0 | 0 | 0 | 0 | 0 | 0 | 0 |
| Ar | | 37 | 37 | 37 | 37 | 18 | 10 | 9 | 19 |
| CO | | | 1350 | 1350 | 1350 | 67 | 0 | 67 | 684 |
| $H_2$ | | | 1200 | 1200 | 1200 | 1191 | 1000 | 191 | 608 |
| $CO_2$ | | | 200 | 202 | 162 | 679 | | 679 | 82 |
| $CH_4$ | | | 7 | 7 | 7 | 3 | | 3 | 4 |
| $H_2S$ | | | 40 | 42 | 0 | 0 | | 0 | 0 |
| COS | | | 2 | 0 | 0 | 0 | | 0 | 0 |

TABLE III

| Fluid | Mixture "15" | Mixture "16" | Mixture "17" | Mixture "19" | Mixture "23" | Mixture "25" | Mixture "30" | Mixture "21" | Mixture "26" |
|---|---|---|---|---|---|---|---|---|---|
| Composition, dry vol. % | | | | | | | | | |
| $N_2$ | | 0.00 | 0.00 | 0.00 | 0.00 | 0.00 | 0.00 | 0.00 | 0.00 |
| $O_2$ | | 95.00 | 0.00 | 0.00 | 0.00 | 0.00 | 0.00 | 0.00 | 0.00 |
| Ar | | 5.00 | 1.31 | 1.31 | 1.35 | 0.10 | 0.10 | 0.10 | 2.31 |

TABLE III-continued

| Fluid | Mixture "15" | Mixture "16" | Mixture "17" | Mixture "19" | Mixture "23" | Mixture "25" | Mixture "30" | Mixture "21" | Mixture "26" |
|---|---|---|---|---|---|---|---|---|---|
| CO | | | 47.60 | 47.56 | 48.99 | 3.00 | 0.00 | 18.30 | 84.30 |
| $H_2$ | | | 42.31 | 42.28 | 43.54 | 92.80 | 99.90 | 56.60 | 5.72 |
| $CO_2$ | | | 7.05 | 7.12 | 5.86 | 4.00 | 0.00 | 24.40 | 7.30 |
| $CH_4$ | | | 0.25 | 0.25 | 0.25 | 0.10 | 0.00 | 0.61 | 0.37 |
| $H_2S$ | | | 1.41 | 1.48 | 0.00 | 0.00 | 0.00 | 0.00 | 0.00 |
| COS | | | 0.07 | 0.00 | 0.00 | 0.00 | 0.00 | 0.00 | 0.00 |
|  | | | 100.00 | 100.00 | 100.00 | 100.00 | 100.00 | 100.00 | 100.00 |
| kg/h | 1000 | 1050 | | | | | | | |
| dry flow rate $Nm^3/h$ | | 745 | 2836 | 2838 | 2756 | 1197 | 1001 | 196 | 1559 |
| $N_2$ | | 0 | 0 | 0 | 0 | 0 | 0 | 0 | 0 |
| $O_2$ | | 707 | 0 | 0 | 0 | 0 | 0 | 0 | 0 |
| Ar | | 37 | 37 | 37 | 37 | 1 | 1 | 0 | 36 |
| CO | | | 1350 | 1350 | 1350 | 36 | 0 | 36 | 1314 |
| $H_2$ | | | 1200 | 1200 | 1200 | 1111 | 1000 | 111 | 89 |
| $CO_2$ | | | 200 | 202 | 162 | 48 | | 48 | 114 |
| $CH_4$ | | | 7 | 7 | 7 | 1 | | 1 | 6 |
| $H_2S$ | | | 40 | 42 | 0 | 0 | | 0 | 0 |
| COS | | | 2 | 0 | 0 | 0 | | 0 | 0 |

What is claimed is:

1. A combined installation for the production of electricity and of high-purity hydrogen, which comprises:

a first source of a first gaseous mixture containing at least one hydrocarbon;

a second source of a second gaseous mixture containing oxygen in a concentration ranging from 21 to 98%, and a significant concentration of argon ranging up to 5% of argon;

a partial oxidation unit having a first inlet fluidly connected to the first source, a second inlet fluidly connected to the second source, and at least one outlet for outputting a reaction gas mixture containing hydrogen, carbon monoxide, and argon;

a membrane separator having a high $H_2/N_2$, $H_2/CO$, and $H_2/Ar$ selectivity, said membrane separator having an inlet fluidly connected to the outlet of the partial oxidation unit, one retentate outlet for outputting a retentate gas mixture enriched in the less permeable components of the reaction gas mixture, and one permeate outlet for outputting a permeate gas enriched in the more permeable components of the reaction gas mixture;

an adsorption separator having an inlet fluidly connected to the permeate outlet of the membrane separator, and one production outlet for outputting a hydrogen-rich gas mixture having a hydrogen purity of at least 99.5%; and an electricity generation unit having one inlet fluidly connected to said retentate outlet of the membrane separator.

2. The combined installation according to claim 1, further comprising, between the outlet of the partial oxidation unit and the inlet of the membrane separator, at least one of the following gas purification units:

a unit for the catalytic conversion of carbon monoxide into carbon dioxide and hydrogen, using steam;

a unit for the conversion of carbonyl sulphide; and a desulphurization unit.

3. The combined installation according to claim 2, further comprising a desulphurization unit positioned between the retentate outlet of the membrane separator and the inlet of the electricity generation unit.

4. The combined installation according to claim 1, further comprising a desulphurization unit positioned between the retentate outlet of the membrane separator and the inlet of the electricity generation unit.

* * * * *